US009286854B2

(12) United States Patent  (10) Patent No.: US 9,286,854 B2
Klarke et al.  (45) Date of Patent: Mar. 15, 2016

(54) MULTI-INTERFACE STREAMING MEDIA SYSTEM

(75) Inventors: Lloyd Klarke, Sunnyvale, CA (US);
Greg Garner, Springdale, AR (US);
Carl Sassenrath, Ukiah, CA (US);
Anthony Wood, Palo Alto, CA (US);
Scott Edward de Haas, Saratoga, CA (US)

(73) Assignee: Roku, Inc., Saratoga, CA (US)

( * ) Notice: Subject to any disclaimer, the term of this patent is extended or adjusted under 35 U.S.C. 154(b) by 138 days.

(21) Appl. No.: 13/347,619

(22) Filed: Jan. 10, 2012

(65) Prior Publication Data

US 2013/0111533 A1  May 2, 2013

Related U.S. Application Data

(63) Continuation-in-part of application No. 13/340,507, filed on Dec. 29, 2011, now Pat. No. 9,131,260, which is a continuation-in-part of application No. 13/286,122, filed on Oct. 31, 2011, now abandoned.

(51) Int. Cl.
*H04N 7/16* (2011.01)
*G09G 5/00* (2006.01)
*H04N 21/426* (2011.01)
*H04N 21/437* (2011.01)
*H04N 21/414* (2011.01)
(Continued)

(52) U.S. Cl.
CPC .............. *G09G 5/006* (2013.01); *G06F 1/263* (2013.01); *H04N 21/41407* (2013.01); *H04N 21/426* (2013.01); *H04N 21/436* (2013.01); *H04N 21/437* (2013.01); *H04N 21/438* (2013.01); *G09G 2330/021* (2013.01); *G09G 2370/027* (2013.01); *G09G 2370/12* (2013.01); *G09G 2370/16* (2013.01); *H04N 7/102* (2013.01); *H04N 21/443* (2013.01)

(58) Field of Classification Search
CPC .......... H04N 21/41407; H04N 21/426; H04N 21/436; H04N 21/437; H04N 21/438
USPC .................................................. 725/151, 153
See application file for complete search history.

(56) References Cited

U.S. PATENT DOCUMENTS 5,675,390 A   10/1997  Schindler et al.
5,990,927 A * 11/1999  Hendricks et al. ............ 725/132
(Continued)

OTHER PUBLICATIONS

Office Action issued to U.S. Appl. No. 13/286,122, Jan. 31, 2013, 16 pgs.
(Continued)

*Primary Examiner* — Dominic D Saltarelli
(74) *Attorney, Agent, or Firm* — Sterne, Kessler, Goldstein & Fox P.L.L.C.

(57) ABSTRACT

A streaming media device includes a printed circuit board hosting components configured to access internet data. An audio/visual connector is linked to the printed circuit board, wherein the audio/visual connector is adapted for connection to an audio/visual device, wherein the audio/visual connector is adapted to operate with a first audio/visual interface having sufficient power to fully operate the printed circuit board and a second audio/visual interface having insufficient power to fully operate the printed circuit board. A power connector is linked to the printed circuit board, wherein the power connector selectively receives power based on the audio/visual connector utilizing one of the first audio/visual interface and the second audio/visual interface.

18 Claims, 6 Drawing Sheets

(51) Int. Cl.
  *H04N 21/438* (2011.01)
  *H04N 21/436* (2011.01)
  *G06F 1/26* (2006.01)
  *H04N 7/10* (2006.01)
  *H04N 21/443* (2011.01)

(56) References Cited

U.S. PATENT DOCUMENTS 6,745,223 B1   6/2004   Nobakht et al.
6,965,593 B2 *   11/2005   Donahue et al. ............. 370/352
8,208,001 B2   6/2012   Tucker et al.
2007/0250872 A1   10/2007   Dua
2008/0134237 A1   6/2008   Tu et al.
2009/0313675 A1   12/2009   Howarter et al.
2010/0261510 A1   10/2010   Rajamani et al.
2011/0037447 A1   2/2011   Mair

OTHER PUBLICATIONS

Office Action issued to U.S. Appl. No. 13/340,507, Jan. 22, 2013, 10 pgs.

* cited by examiner

MULTI-INTERFACE STREAMING MEDIA SYSTEM

CROSS-REFERENCE TO RELATED APPLICATION

This application is a continuation-in-part of U.S. Ser. No. 13/340,507, filed Dec. 29, 2011, and entitled "Streaming Media System", which is a continuation-in-part of U.S. Ser. No. 13/286,122, filed Oct. 31, 2011, and entitled "Internet Access Card for Deployment within a Television."

FIELD OF THE INVENTION

This invention relates generally to television functionality. More particularly, this invention relates to a technique for augmenting television functionality through a media streaming device deployed through an audio/visual device.

BACKGROUND OF THE INVENTION

Roku, Inc., of Saratoga, Calif., the assignee of the present invention, currently offers a streaming media platform for connection to a television. In particular, the streaming media platform utilizes a cable (i.e., a High Definition Multimedia Interface or HDMI cable) to connect to external ports of a television. The streaming media platform uses a wireless connection to access the internet. Consequently, streamed media from the internet is wirelessly collected by the streaming media platform and is applied to the cable for display on a television.

There are commercially available televisions with resident internet access circuits. These internet access circuits may access the internet through a wireless connection or a wired connection, such as an Ethernet cable connection. Many purchasers are reluctant to purchase a television with a built-in internet access circuit because such purchasers do not want to be committed to a certain internet connection interface.

SUMMARY OF THE INVENTION

One aspect of the invention relates to a streaming media device. In one embodiment, the streaming media device includes a printed circuit board hosting components configured to access internet data. An audio/visual connector is linked to the printed circuit board, wherein the audio/visual connector is adapted for connection to an audio/visual device, wherein the audio/visual connector is adapted to operate with a first audio/visual interface having sufficient power to fully operate the printed circuit board and a second audio/visual interface having insufficient power to fully operate the printed circuit board. A power connector is linked to the printed circuit board, wherein the power connector selectively receives power based on the audio/visual connector utilizing one of the first audio/visual interface and the second audio/visual interface.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
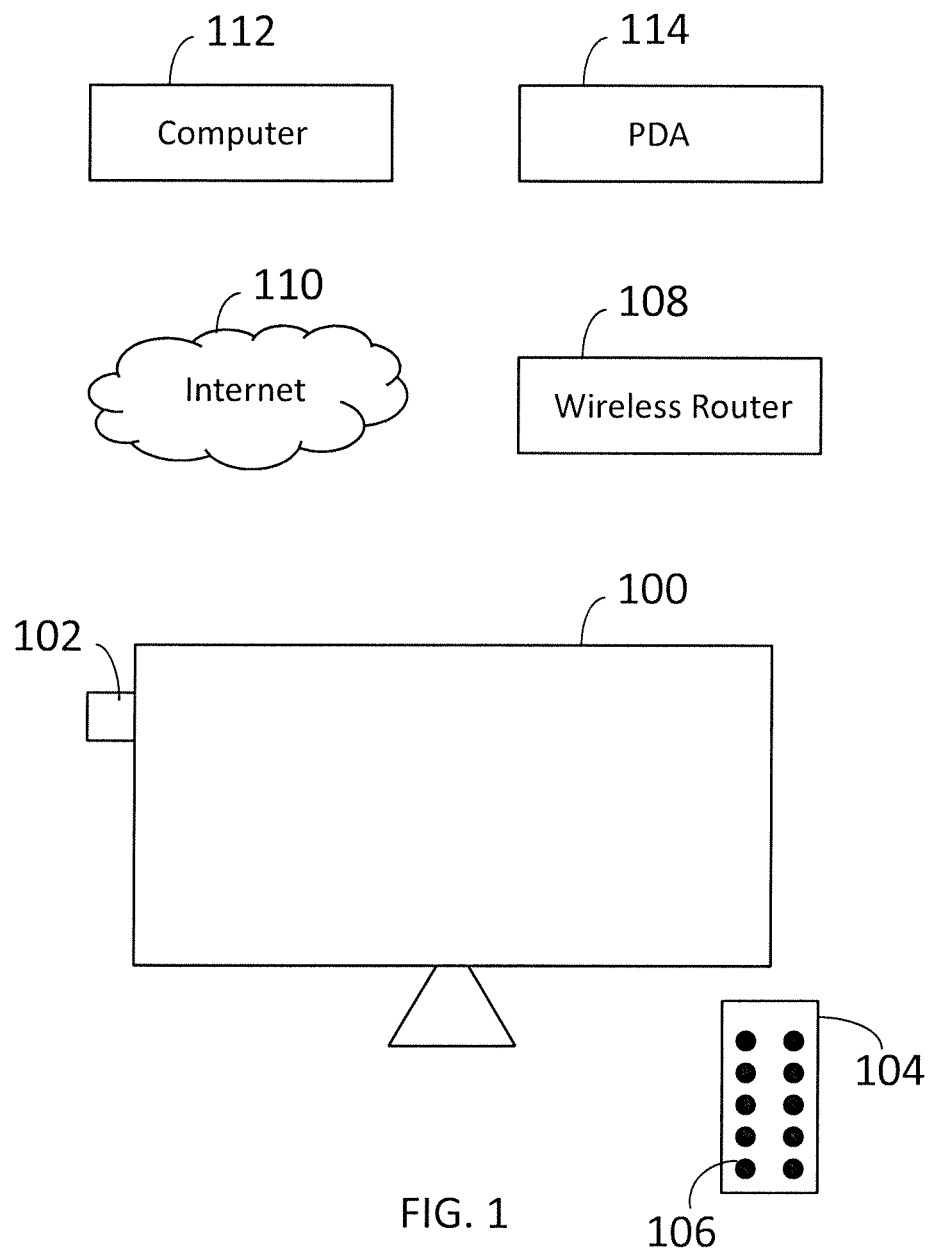
FIG. 1 illustrates components associated with an embodiment of the invention.

FIG. 1 illustrates components associated with an embodiment of the invention. In particular, the figure illustrates a television 100 with a card bay to receive an internet access card 102, the configuration of which is discussed below. The television 100 is operative with a remote 104, which includes buttons 106. The television 100 as described is an example of a device that is capable of presenting audio and visual information. Such a device is commonly referred to as an audio/visual device.

FIG. 1 also illustrates the internet 110, which is connected to a wireless router 108. The wireless router 108 is in proximity to the television 100, which allows the internet access card 102 to collect internet data. The wireless router 108 may also communicate with other proximate devices, such as a computer 112 and a personal digital assistant 114.

Thus, the internet access card 102 provides an internet streaming solution as an add-on to a television. Consequently, the television manufacturer does not need to bear the cost of an internet streaming solution associated with a particular supplier. Instead, a consumer may chose from one of many internet access cards 102 and simply plugs a selected solution into the television 100. This makes television purchasing easier since the consumer can purchase a television that is compatible with many internet streaming platforms. The consumer has the flexibility to purchase a low cost connectivity solution without being tied to a solution embedded within the television. If an internet access card 102 is not installed, then the television operates in a standard manner.

Figure 2:
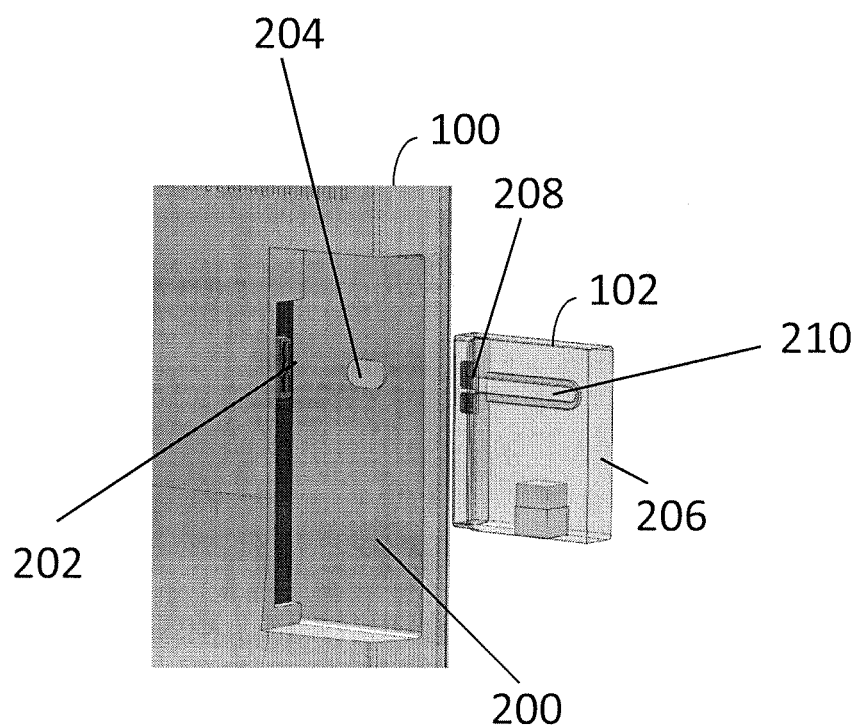
FIG. 2 illustrates an internet access card for engagement with a television in accordance with an embodiment of the invention.

FIG. 2 is a rear view of the television 100. The television 100 includes a card bay 200, in this case a recessed region at the rear of the television. The card bay 200 includes a card bay electrical interface 202, which may be in the form of a female socket.

FIG. 2 also illustrates the internet access card 102, which includes a card housing 206. The internet access card 102 also includes card leads 208, which may be in the form of a male socket with double sided leads (i.e., leads on each side of a printed circuit board). The card housing 206 may include a card guide 210. In one embodiment, the card guide 210 is a recessed region within the card housing 206. The card guide 210 is configured to engage a protruding card bay guide 204 in card bay 200. Preferably, this guide arrangement provides a mechanical key that allows for engagement with the card bay electrical interface 202 only when the card 102 is properly positioned. The guide arrangement also operates to support the card 102 when engaged with the card bay electrical interface 202.

Figure 3:
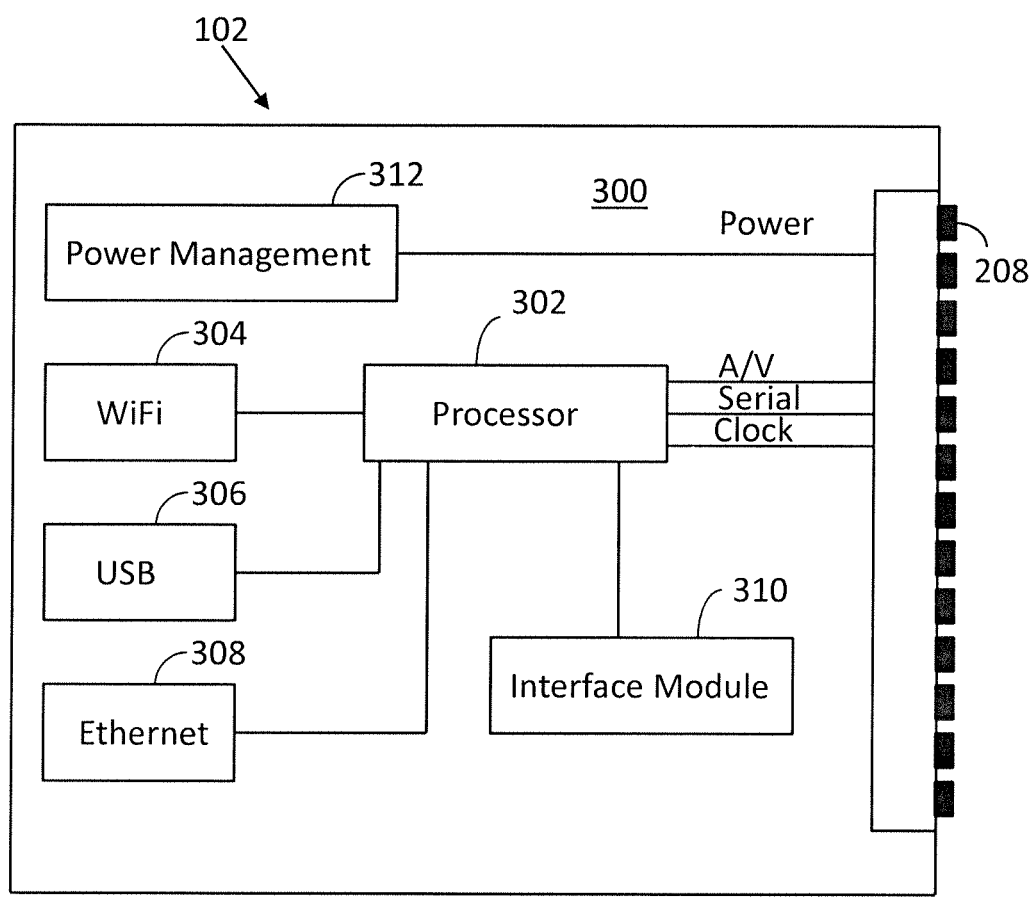
FIG. 3 illustrates components associated with an internet access card configured in accordance with an embodiment of the invention.

FIG. 3 illustrates electrical components associated with internet access card 102. The card includes a set of card leads 208, which may be placed on top and bottom surfaces of a printed circuit board 300. Exemplary pin assignments are as follows:

| Pin | Side A | Side B | Comments |
|---|---|---|---|
| 1 | 5 V | GND | Ground pins are longest |
| 2 | GND | 5 V | 5 V at 6 W total |
| 3 | HPD | CEC | |
| 4 | GROUND | CLK+ | HDMI Out CLK + and − |
| 5 | GROUND | CLK− | |
| 6 | D0+ | GROUND | HDMI Out D0 + and − |
| 7 | D0− | GROUND | |
| 8 | GROUND | D1+ | HDMI Out D1 + and − |
| 9 | GROUND | D1− | |
| 10 | D2+ | GROUND | HDMI Out D2 + and − |
| 11 | D2− | GROUND | |
| | | Mechanical KEY | |
| 12 | HDMI SDA | Serial Data TX | TX from TV to Card, 119200, N, 8, 1, 3.3 V |
| 13 | HDMI SCL | Serial Data RX | RX from Card to TV, 119200, N, 8, 1, 3.3 V |
| 14 | Reset_n | FUTURE | Reset goes low to reset our card, high to run |
| 15 | TV_WakeReq_n | TV_StbyState_n | Used to wake the TV up from standby |
| 16 | Crd_StbyReq_n | Crd_StbyState_n | Standby goes low request card standby |
| 17 | FUTURE | 5 V | |
| 18 | CARD_DETAn | GROUND | Ground pins are longest |

The different pins may be characterized as follows.

FUTURE: This means that the line is reserved for future definition. The line is not connected in this embodiment of the card.

GND: These are the system ground pins. Preferably, they are the longest pin on the male card edge connector, such that they contact the female connector first.

5V: In one embodiment, there is 6 W of 5V power. The HDMI specification requires 4.8V to 5.3V. In one embodiment, these pins are the $2^{nd}$ longest pins.

HPD: This is the standard HDMI Hot Plug Detect (HPD) pin as defined in the HDMI specification for a HDMI source (TV card).

CEC: This is the standard HDMI Consumer Electronics Control (CEC) line, as defined by the HDMI specification.

CLK+, CLK−: This is the standard HDMI TMDS clock pair used to transmit data from the source (card 102) to the sink (TV 100).

D0+,D0−: This is the standard HDMI TMDS data pair 0 used to transmit data from the source (card 102) to the sink (TV 100).

D1+,D1−: This is the standard HDMI TMDS data pair 1 used to transmit data from the source (card 102) to the sink (TV 100).

D2+,D2−: This is the standard HDMI TMDS data pair 2 used to transmit data from the source (card 102) to the sink (TV 100).

Mechanical Key: This is a slot that is cut into the male connector between pins 11 and 12, and is used to make sure that the card cannot be inserted backwards.

HDMI SDA: This is the HDMI standard Display Data Channel (DDC) I2C data line used to read the EDID from the sink (TV 100).

HDMI SCL: This is the HDMI standard Display Data Channel (DDC) I2C clock line used to read the EDID from the sink (TV 100).

Serial Data TX: This is the Transmit serial data line with data direction from the TV 100 to the card 102. The voltage signaling level on this card may be 3.3V. The baud rate may be 119200, and the protocol may be N,8,1. The signaling level may be specified by a Universal Asynchronous Receiver/Transmitter (UART) and may be inverted from the normal sense of 12V RS232.

Serial Data RX: This is the Receive serial data line with data direction from the card 102 to the TV 100. The voltage signaling level on this card may be 3.3V. The baud rate may be 119200, and the protocol may be N,8,1. In one embodiment, the signaling level is from the UART and is inverted from the normal sense of 12V RS232.

Reset_n: This is the active low reset signal from the TV 100 to the card 102. The TV 100 should hold this line low as long as there is no card inserted. When a card 102 is inserted, the TV is to keep this line low for about 200 mS, then raise this line to 3.3V. If the TV is unplugged and plugged back in, then the TV should hold the line low for 200 mS and raise the line to 3.3V. This line will not be toggled when the user turns the TV on and off.

TV_WakeReq_n: The card 102 makes this signal go low to request the TV 100 to wake up. This signal is used to wake up the TV in the condition for example if the user presses a key on the RF remote 104. Under normal conditions this signal is high.

TV_StbyState_n: This signal is low when the TV is in standby mode. It is high when the TV is in regular running mode. The TV drives this signal.

Crd_StbyReq_n: The TV 100 will bring this signal low to ask the card 102 to go into standby mode. It will bring this signal high to ask the card 102 to go back into normal power mode.

Crd_StbyState_n: The card 102 makes this signal go low when the card 102 is in standby mode; it will go high when the card 102 is in normal power mode.

CARD_DETAn: The card 102 grounds this signal when the card is inserted. It may do this by connecting this pin to a ground pin on the card 102. The TV 100 pulls up this signal with a ~10K resistor, and then when this signal goes low it lets the TV know that a card has been inserted.

FIG. 3 illustrates the processor 302 receiving some of these signals. In particular, audio/video (A/V) corresponds to specified HDMI signals, "serial" corresponds to the UART serial signals and "clock" corresponds to the different specified clock signals. The processor 302 may be an embedded multimedia applications processor, such as the BCM 2835, sold by Broadcom, Irvine, Calif. The printed circuit board 300 also hosts a power management chip 312, which may be the BCM959002 power management unit sold by Broadcom, Irvine, Calif. The power management chip 312 receives a power signal from leads 208. Thus, the card 102 does not require a separate power supply. It should be appreciated that the serial link of FIG. 3 may be any communication link configured to support a specified communication protocol. The specified communication protocol may be Consumer Electronics Control (CEC), Serial Peripheral Interface Bus (SPI), Inter-Integrated Circuit (I2C) or a parallel bus.

The processor 302 is also connected to a WiFi circuit 304, which may include one or more antennas. The WiFi circuit supports wireless communications, with for example, a wireless router. In one embodiment, there is also a Uniform Serial Bus (USB) port 306. An Ethernet port 308 may also be provided, which allows for a hardwired connection to the internet. These ports should be exposed to the user when the card 102 is inserted in the television 100

An interface module 310 is also connected to the processor 302. The interface module is a set of executable instructions stored in memory, which are executed by the processor 302. The interface module 310 provides a graphical user interface for display on the television 100. That is, in certain modes, the card 102 operates as a master device, while the television 100 operates as a slave device. Control signals to the television 100 may be supplied with CEC commands in the HDMI protocol. For example, an infrared receiver on the television may receive a command from a remote. The television sends the command over the internal HDMI CEC link to the card 102. The card 102 may then provide the appropriate command back to the television 100 via an HDMI CEC link.

Figure 4:
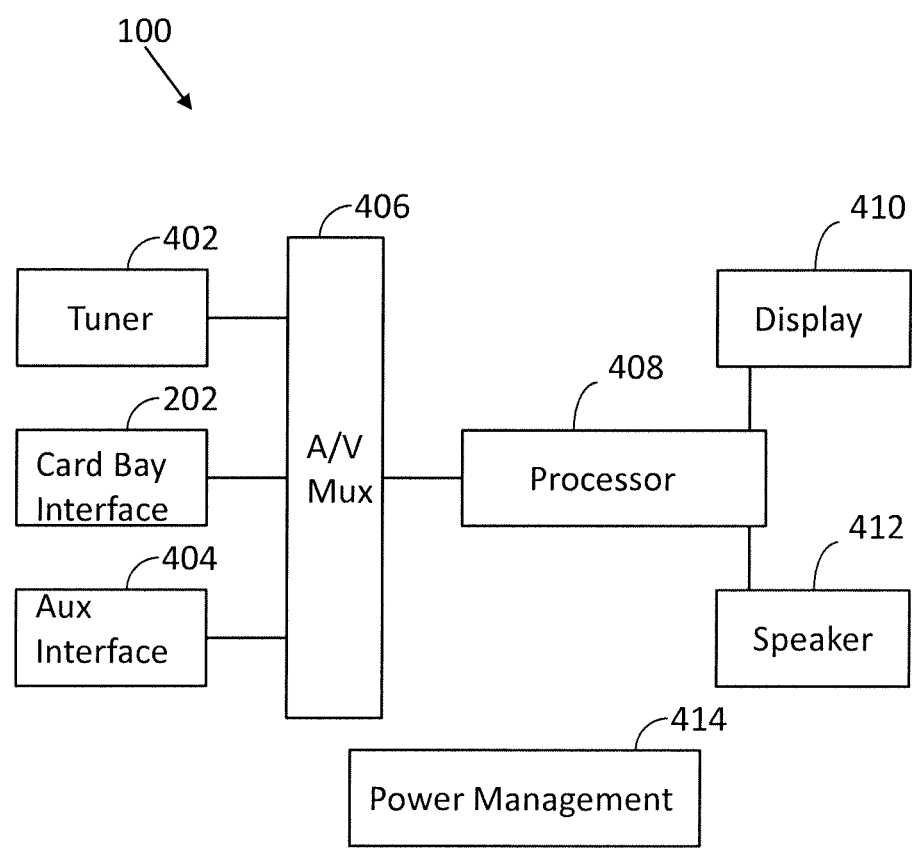
FIG. 4 illustrates components associated with a television configured in accordance with an embodiment of the invention.

FIG. 4 illustrates a television 100 configured in accordance with an embodiment of the invention. The television 100 is configured to include the card bay electrical interface 202. This interface is relatively inexpensive and therefore does not present a barrier to adoption for television manufacturers.

Other inputs may include a tuner 402 (e.g., a high definition television tuner) and an auxiliary interface 404. An audio/visual signal source multiplexer 406 operates under the control of the processor 408 to select an audio/visual signal input. The processor 408 performs standard functions to produce a visual signal at display 410 and an audio signal at speaker 412. The television 100 also includes a standard power management circuit 414. Observe that the card bay electrical interface 202 provides a link to the internal electronics of the television 100. This allows the card 102 to control the television 100, such as to provide a graphical user interface from the interface module 310.

In one embodiment, the card 102 is 3 inches wide, 4 inches long and 0.75 inches thick. The invention is operative with a simple remote. For example, to access streaming content, only a small set of buttons is required, which may include a home key, back key, OK key, left navigation key, right navigation key, up navigation key, down navigation key, play/pause key, double arrow left key, and a double arrow right key. Alphanumeric keys are not required. Instead, the interface module 310 provides a graphical user interface that allows a user to navigate through content using only the specified keys. The home key may be used to invoke control by the card 102. Alternately, control by the card 102 may be invoked by using a remote to toggle through different video input selections. A separate remote may be used with the card 102. Alternately, signals from a universal remote or dedicated remote for a television manufacturer may be mapped to operations, as specified by the interface module 310.

Figure 5:
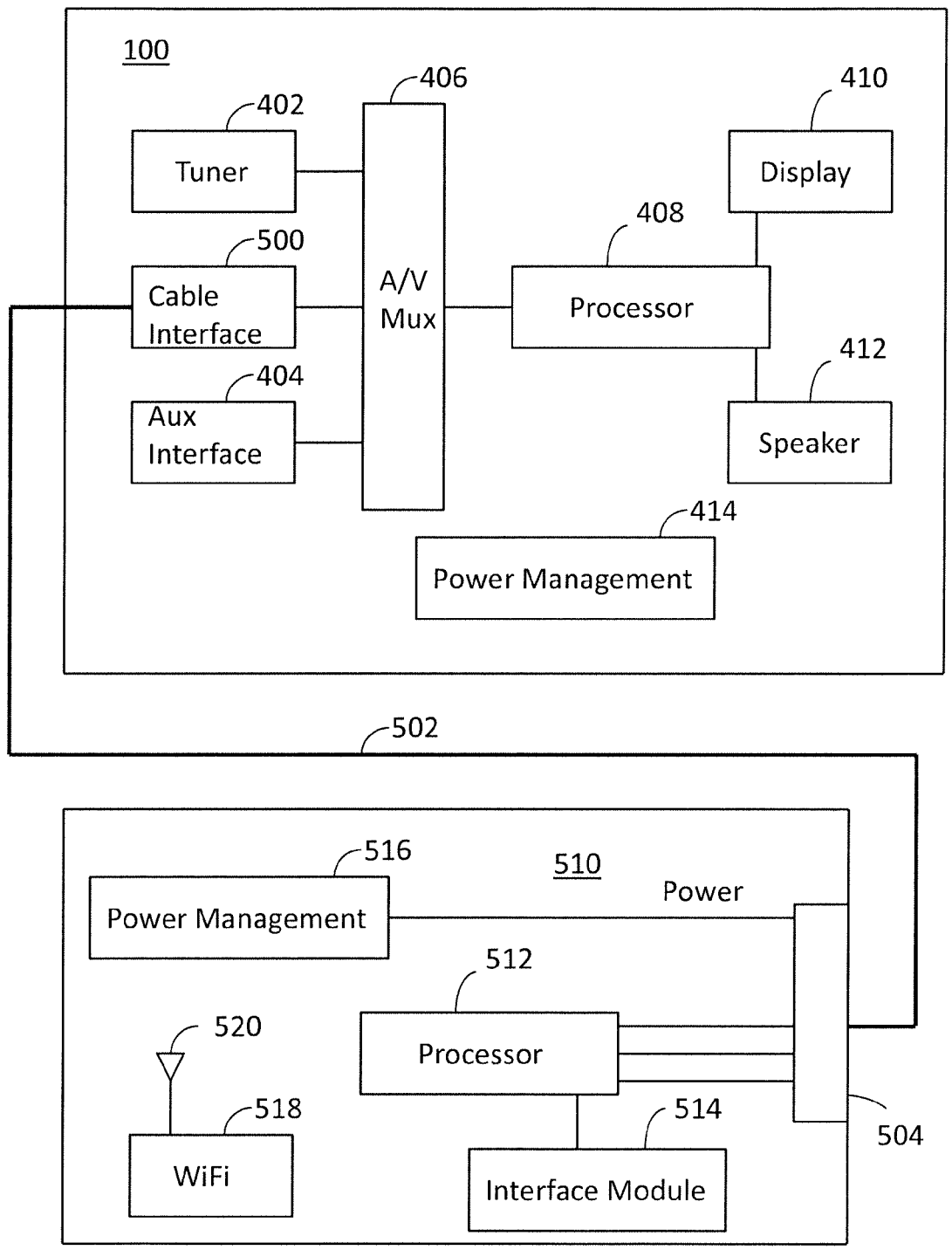
FIG. 5 illustrates a media streaming device configured in accordance with an embodiment of the invention.

FIG. 5 illustrates a media streaming device 510 configured in accordance with an embodiment of the invention. The device 510 is configured to connect with the television 100. In one embodiment, the device 510 is configured to stream media content from a source and make the streamed media accessible to the television 100. In addition, the device 510 can also be configured to control the functionality of the television 100.

In one embodiment, a cable 502 operates as an interface with television 100. Television 100 corresponds to television 100 of FIG. 4, but instead of the card bay interface 202 of FIG. 4, a cable interface 500 is used. In one embodiment, the cable interface 500 is a Mobile High-Definition Link (MHL) cable interface. In another embodiment, the cable interface 500 is directly connected with a connector 504 without the use of the cable 502 while still utilizing an MHL interface through a connector such as HDMI connector, universal serial bus (USB) connector, and micro USB connector. MHL is a proposed industry standard for a mobile audio/video interface for directly connecting mobile phones to high-definition televisions (HDTVs) and displays. The MHL standard features a single cable or connector with a low pin-count interface able to support up to 1080p high-definition (HD) video and digital audio while simultaneously providing power for the connected device.

In one embodiment, the cable interface 500 is configured to decode signals received from the cable 502 or through the connector 504. In one embodiment, the connector 504 is configured to encode signals from the device 510.

Although not a mobile phone device that is contemplated by the MHL standard, the device 510 is a dedicated device capable of streaming media to the television 100 and controlling the television 100. The connector 504 on the device 510 may be in any number of forms because MHL is connection agnostic. Thus, the interface may be a micro Universal Serial Bus (USB) connection or an HDTV connection (e.g., HDMI).

The device 510 also includes a processor 512 and interface module 514. The interface module 514 supports MHL standard operations along with other operations specified in connection with other embodiments of the disclosed technology. A power management circuit 516 manages the power coming into the device 510 from the television 100. The device 510 is powered from a lead at connector 504 and via the television 100.

A WiFi circuit 518 is also resident within the device 510. An antenna 520 is connected to the WiFi circuit 518. The antenna 520 may be formed on a printed circuit board (not shown) associated with the components of the device 510. Alternately, the antenna 520 may be incorporated into cable 502 or another externally mounted device. In another embodiment, the antenna 520 is externally mounted outside the device 510 and is coupled to the device 510 via a connector. For example, an externally mounted antenna can be located away from the device 510 and near the television 100 to optimize a signal being received by the antenna 520 for use by the device 510. In yet another embodiment, the antenna 520 is comprised of a conductive medium such as a wire and is located external of the device 510.

In one embodiment, the remote 104 is configured to communicate with the device 510. The interface module 514 is configured to be responsive to the remote 104. This allows the interface module 514 to operate as a master control device, with the television 100 operating as a slave device. For example, the interface module 514 may include an infrared sensor to communicate with the remote 104. In one embodiment, the remote 104 controls both the device 510 and the television 100. In another embodiment, the remote 104 is configured as a simplified remote. For example, to access streaming content, only a small set of buttons is required, which may include a home key, back key, OK key, left navigation key, right navigation key, up navigation key, down navigation key, play/pause key, double arrow left key, and a double arrow right key. Alphanumeric keys are not required. Instead, the interface module 514 provides a graphical user interface that allows a user to navigate through content using only the specified keys. The home key may be used to invoke control of the television 100 by the device 510.

In one instance, the television 100 may lack the ability to control volume selection, channel selection, and/or source selection. In another instance, the television 100 has the capability of volume control, channel selection, and source selection. In both instances, the remote 104 can serve as the primary interface and control both the device 510 and the television 100. For example, the remote 104 is configured to control the source selection, channel selection and/or volume for the television 100 by sending the appropriate instructions through the interface module 514 of the device 510.

In another embodiment, these instructions are further encoded by the interface module 514 from instructions from the remote 104 into a format that can be used to control the television 100. In one embodiment, the functionality of the interface module 514 is separated into two distinct modules; one module for interfacing with the remote 104 commands and another module for encoding instructions into another format such as the MHL interface. Further, representations of these instructions originating from the remote 104 are routed to the television 100 through the connector 504. In one embodiment, the connector 504 utilizes the MHL interface to control the television 100.

In use, the remote 104 is configured to control streaming media and other functionality of the device 510 in addition to controlling aspects of the television 100 such as volume, channel selection and source selection.

Alternately, control by the device 510 may be invoked by using a remote to toggle through different video input selections. A separate remote may be used with the device 510. Alternately, signals from a universal remote or dedicated remote for a television manufacturer may be mapped to operations, as specified by the interface module 514.

Figure 6:
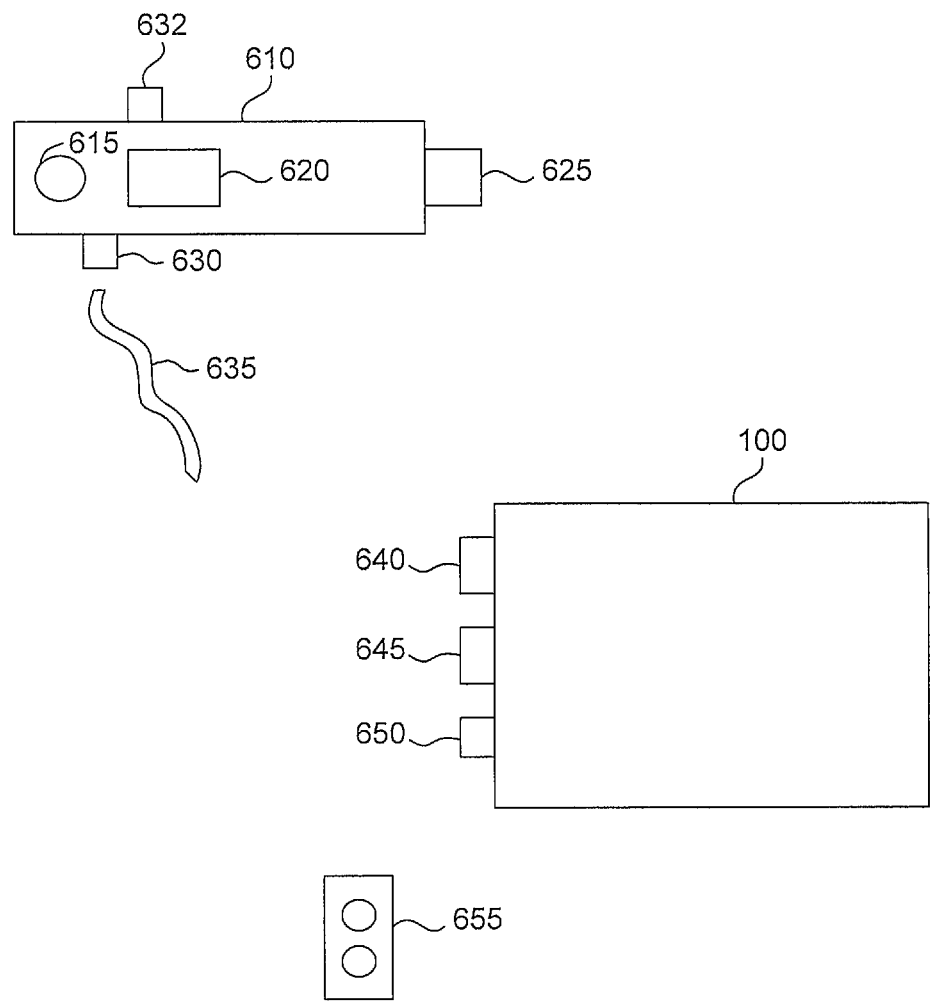
FIG. 6 illustrates a media streaming device configured in accordance with an embodiment of the invention.

FIG. 6 illustrates a media streaming device 610 configured in accordance with an embodiment of the invention. The device 610 is configured to connect with the television 100. In one embodiment, the device 610 is similar to the device 510 and is also configured to stream media content from a source and make the streamed media accessible to the television 100. In addition, the device 610 can also be configured to connect with the Internet and receive and transmit content via wireless connection similar to the antenna 520 and to display content through the streaming device 610 to the television 100.

The device 610 is configured to be compatible with multiple audio/visual interfaces. In one embodiment, the device 610 is compatible with both HDMI and MHL interfaces through a single connector. In addition to the elements recited and shown within the device 510, the device 610 also includes an indicator 615, a battery storage 620, connectors 625, 630, and a switch 632.

In one embodiment, the indicator 615 is an LED light which indicates that the device 610 is properly connected with a power source. In one embodiment, a red light displayed on the indicator 615 indicates that the device 610 is improperly connected or not connected to a suitable power source and that the device 610 needs to be connected to a suitable power source for operation. Similarly, a green light displayed on the indicator 615 indicates that the device 610 is properly connected to a suitable power source and is ready for operation. Further, a yellow light displayed on the indicator 615 indicates that the device 610 is not connected to a suitable power source but nonetheless the device 610 can sufficiently operate utilizing the battery storage 620. Further, a blinking yellow light displayed on the indicator 615 can indicate that the charge on the battery storage 620 is running low and needs to be charged for the device 610 to continue operation.

In another embodiment, the indicator 615 is a display screen such as an LCD that is configured to provide a textual or graphical status indicator of the device 610 relative to connectivity of the device 610 for data transmission and power source, and relative to power level of the battery storage 620.

In one embodiment, the battery storage 620 is utilized to provide power to illuminate the indicator 615. In another embodiment, the battery storage 620 is utilized to power the device 610. The battery storage 620 may be recharged through the device 610 connecting with one of the connectors 640, 645, 650, and 655.

In one embodiment, the connector 625 is configured to physically connect with an HDMI port. In another embodiment, the connector 625 can be connected with another type of port such as DVI and SVGA. Further, the connector 625 is configured to operate in accordance with both the HDMI interface and the MHL interface.

In one embodiment, the connector 630 is configured to connect with and receive power through a power cord 635. In one embodiment, the connector 630 and the power cord 635 are optimized to receive power through a USB port and/or a traditional wall socket outlet. In another embodiment, the power cord 635 can operate as an antenna similar to the antenna 520. In one embodiment, the switch 632 is utilized to manually select an audio/visual interface for use with the device 610.

In one embodiment, the television 100 includes connectors 640, 645, and 650. In one embodiment, the connectors 640 and 645 are compatible with an HDMI connector form factor. In one embodiment, the connector 640 is capable of supporting both the MHL interface and HDMI interface; and the connector 645 is not capable of supporting the MHL interface and is capable of supporting the HDMI interface. Further, the connector 650 is compatible with at least one of a USB connection and a micro-USB connection. A connector 655 is a wall power outlet capable of providing an electrical charge. In one embodiment, the connector 655 delivers one of 110 volts and 220 volts.

In use, the device 610 detects the type of audio/visual interface (e.g. HDMI and MHL) through the connector 625. Further, the processor 512 within the device 610 determines the requirements to properly operate the device 610 with the television 100 and coordinates operation, charging, and messaging between the battery storage 620 and the connectors 625 and 630.

In use, when the device 610 is coupled to the television 100 through the connector 625 and the connector 640 (which in one embodiment is MHL enabled), the device 610 detects sufficient power and audio/visual connectivity and is capable of fully operating with the television 100 without further connections. In one embodiment, the indicator 615 illuminates with a green light indicating a proper connection between the device 610 and the television 100. In another embodiment, the device 610 transmits a signal to the television 100 that indicates the device 610 is properly connected; and the television 100 is able to display a message that indicates the device 610 is properly connected.

In another use, when the device 610 is coupled to the television 100 through the connector 625 and the connector 645 (which in one embodiment is only HDMI enabled), the device 610 detects sufficient audio/visual connectivity and insufficient external power and is not capable of operating with the television 100 without further connections to external power or relying on internal power such as the battery storage 620. In this embodiment, additional power needs to be received by the device 610 for proper operation with the television 100. In one embodiment, power is delivered to the device 610 through the connector 630 (on the device 610), the power cord 635, and the connector 650 (a USB port on the television 100). In another embodiment, the device 610 is powered through the connector 655 which is a wall power outlet.

Prior to connection of the device 610 with an external power source through representative connectors 650 and 655 and subsequent to connection of the device 610 with the connector 645, the indicator 615 illuminates with a red light indicating a need for a power source for proper operation between the device 610 and the television 100. In this embodiment, the device 610 transmits a signal to the television 100 that indicates the device 610 requires a power source; and the television 100 is able to display a message that indicates that an external power source needs to be connected through the connector 630 and the power cord 635. In one embodiment, the battery storage 620 provides sufficient power to transmit this signal from the device 610 to the television 100. In another embodiment, the HDMI interface through the connection of the device 610 and the connector 645 provides sufficient power to transmit this signal from the device 610 to the television 100. Although this signal is transmitted from the device 610 to the television 100, there is not sufficient power to fully operate the device 610 with the television 100.

In one embodiment, the power to illuminate the indicator 615 comes from the power pin within the HDMI interface within the connector 645. In another embodiment, power to illuminate the indicator comes from the battery storage 620. In this instance, once an external power source such as the connectors 650 and 655 is provided to the device 610, the indicator 615 illuminates with a green light indicating a proper connection between the device 610 and the television 100.

In another embodiment, the device 610 is configured to properly operate with the television 100 while relying on the battery storage 620 and solely connected to the connector 645 being supported by the HDMI interface. In this instance, the device 610 detects this condition and is configured to draw power from the battery storage 620 to properly operate the device 610 in conjunction with the television 100. While connected to the connector 645 and operating solely on the battery storage 620 (without an external power source), the indicator 615 illuminates with a yellow light indicating that the device 610 is operating on an internal power source. During operation of the device 610 while solely on the battery storage 620, the indicator 615 illuminates with a blinking yellow light indicating that the power level within the battery storage 620 is low and will need to be recharged. In one embodiment, the speed of the blinking yellow light will indicate severity of the power depletion within the battery storage 620. Further, the color of the light may be changed to red as the power level of the battery storage 620 reaches critically low levels that would prevent the device 610 from operating. In this embodiment, the device 610 transmits a signal to the television 100 that indicates the device 610 is currently running on an internal power source (the battery storage 620); the amount of power remaining; and the charge state which consists of discharging and charging. This signal from the device 610 instructs the television 100 to display a message that indicates the current charge of the storage battery 620, the charge state, and further instructions such as connecting the device 610 to an external power source through the connectors 640, 645, 650, and 655 that have a sufficient power supply to charge the storage battery 620 and/or to power the device 610 to properly operate with the television 100.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A streaming media device, comprising:
a board hosting components configured to access streamed data;
an audio/visual connector linked to the board, wherein the audio/visual connector is adapted for physical connection to a connector of a display device such that the streaming media device is coupled onto the connector of the display device, wherein the audio/visual connector is adapted to operate with a first audio/visual interface having sufficient power to fully operate the printed circuit board and a second audio/visual interface having insufficient power to fully operate the printed circuit board;
a power connector linked to the printed circuit board, wherein the power connector selectively receives power based on the audio/visual connector utilizing one of the first audio/visual interface and the second audio/visual interface;
a power cord that is removably coupled to the power connector and configured to deliver power to the power connector through an external power source;
a visual indicator to provide indicia of physical connection state between the streaming media device and the connector of the display device; and
a processor coupled to the board and configured to:
detect whether the first audio/visual interface or second audio/visual interface is being utilized through the audio/visual connector; and
determine power requirements based on the detected audio/visual interface being utilized through the audio/visual connector.

2. The streaming media device of claim 1, wherein the first audio/visual interface is Mobile High-Definition Link (MHL).

3. The streaming media device of claim 1, wherein the second audio/visual interface is High-Definition Multimedia Interface (HDMI).

4. The streaming media device of claim 1, further comprising a battery storage linked to the board and configured to be charged selectively through one of the power connector and the audio/visual connector.

5. The streaming media device of claim 1, wherein the processor is configured to coordinate messages transmitted through the audio/visual connector based on the audio/visual connector utilizing one of the first audio/visual interface and the second audio/visual interface and power received through the power connector.

6. The streaming media device of claim 1, wherein the visual indicator provides indicia of physical connection state and power resources for the streaming media device.

7. The streaming media device of claim 6, wherein the indicia of physical connection state and power resources specify proper connection to a power source, improper connection to a power source and battery utilization.

8. The streaming media device of claim 1, wherein the external power source is one of a USB enabled connection and a wall outlet.

9. The streaming media device of claim 1, wherein the power cord also functions as an antenna.

10. A streaming media device, comprising:
a printed circuit board hosting components configured to access streamed internet data from a wireless router;
an audio/visual connector linked to the printed circuit board, wherein the audio/visual connector is adapted for direct physical connection to an externally mounted connector of a television such that the streaming media device is directly coupled onto the connector of the television, wherein the audio/visual connector is adapted to operate with a first audio/visual interface having sufficient power to fully operate the printed circuit board and a second audio/visual interface having insufficient power to fully operate the printed circuit board;
a housing enclosing the printed circuit board and a portion of the connector, wherein an entirety of the housing is configured to fit in a rear input/output bay of the television;
a power connector linked to the printed circuit board, wherein the power connector selectively receives power based on the audio/visual connector utilizing one of the first audio/visual interface and the second audio/visual interface;
a visual indicator to provide indicia of physical connection state between the streaming media device and the externally mounted connectors of the television; and
a power cord that is removably coupled to the power connector and configured to deliver power to the power connector through an external power source, wherein the external power source is one of a USB enabled connection and a wall outlet and the power cord also functions as an antenna.

11. The streaming media device of claim 10, wherein the first audio/visual interface is Mobile High-Definition Link (MHL).

12. The streaming media device of claim 10, wherein the second audio/visual interface is High-Definition Multimedia Interface (HDMI).

13. The streaming media device of claim 10, further comprising a battery storage linked to the printed circuit board and configured to be charged selectively through one of the power connector and the audio/visual connector.

14. A streaming media device, comprising:
a board hosting components configured to access streamed internet data;
an audio/visual connector linked to the board, wherein the audio/visual connector is adapted for connection to an externally mounted connector of an audio/visual player such that the streaming media device is coupled onto the connector of the audio/visual player, wherein the audio/visual connector is adapted to operate with a first audio/visual interface having power to operate the board and a second audio/visual interface having insufficient power to operate the printed circuit board;
a power connector linked to the board, wherein the power connector selectively receives power based on the audio/visual connector utilizing one of the first audio/visual interface and the second audio/visual interface;
a visual indicator to provide indicia of physical connection state between the streaming media device and the externally mounted connectors of the audio/visual player; and
a power cord that is removably coupled to the power connector and configured to deliver power to the power connector through an external power source.

15. The streaming media device of claim 14, wherein the first audio/visual interface is Mobile High-Definition Link (MHL).

16. The streaming media device of claim 14, wherein the second audio/visual interface is High-Definition Multimedia Interface (HDMI).

17. The streaming media device of claim 14, further comprising a battery storage linked to the board and configured to be charged selectively through one of the power connector and the audio/visual connector.

18. A streaming media device, comprising:
a board comprising components configured to access streamed data;
an audio/visual connector coupled to the board, wherein the audio/visual connector is adapted for connection to a connector of a display device, wherein the audio/visual connector is adapted to operate with a first audio/visual interface having sufficient power to fully operate the board and a second audio/visual interface having insufficient power to fully operate the board;
a power connector coupled to the printed circuit board, wherein the power connector selectively receives power based on the audio/visual connector utilizing one of the first audio/visual interface and the second audio/visual interface;
a power cord that is removably coupled to the power connector and configured to deliver power to the power connector through an external power source; and
a processor coupled to the board and configured to:
detect whether the first audio/visual interface or second audio/visual interface is being utilized through the audio/visual connector; and
determine power requirements based on the detected audio/visual interface being utilized through the audio/visual connector.

* * * * *